US010655978B2

(12) United States Patent
Marti et al.

(10) Patent No.: US 10,655,978 B2
(45) Date of Patent: May 19, 2020

(54) CONTROLLING AN AUTONOMOUS VEHICLE BASED ON PASSENGER BEHAVIOR

(71) Applicant: Harman International Industries, Incorporated, Stamford, CT (US)

(72) Inventors: Stefan Marti, Oakland, CA (US); Joseph Verbeke, San Francisco, CA (US); Adam Boulanger, Palo Alto, CA (US); Sven Kratz, San Jose, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 16/020,903

(22) Filed: Jun. 27, 2018

(65) Prior Publication Data

US 2020/0003570 A1    Jan. 2, 2020

(51) Int. Cl.
*G01C 21/34*        (2006.01)
*B60W 40/08*        (2012.01)
(Continued)

(52) U.S. Cl.
CPC ......... *G01C 21/3484* (2013.01); *B60W 40/08* (2013.01); *G01C 21/3415* (2013.01); *G01C 21/3461* (2013.01); *G05D 1/0088* (2013.01); *G06K 9/00369* (2013.01); *G06K 9/00832* (2013.01); *B60W 2040/0872* (2013.01); *G05D 2201/0213* (2013.01)

(58) Field of Classification Search
CPC ......... B60W 40/08; B60W 2040/0872; G01C 21/3415; G01C 21/3461; G01C 21/3484; G05D 1/0088; G05D 2201/0213; G06K 9/00369; G06K 9/00832

USPC .......................................................... 701/411
See application file for complete search history.

(56) References Cited

U.S. PATENT DOCUMENTS 9,466,161 B2 * 10/2016 Ricci ..................... G06F 3/0637
9,725,036 B1 * 8/2017 Tarte ....................... B60Q 9/00
(Continued)

FOREIGN PATENT DOCUMENTS

JP        2016137202 A   *   8/2016
WO    2017/177128 A1    10/2017

OTHER PUBLICATIONS

Extended European Search Report for Application No. 19181127.2 dated Nov. 20, 2019.

*Primary Examiner* — Atul Trivedi
(74) *Attorney, Agent, or Firm* — Artegis Law Group, LLP

(57) ABSTRACT

An occupant sensor system is configured to collect physiological data associated with occupants of a vehicle and then use that data to generate driving decisions. The occupant sensor system includes physiologic sensors and processing systems configured to estimate the cognitive and/or emotional load on the vehicle occupants at any given time. When the cognitive and/or emotional load of a given occupant meets specific criteria, the occupant sensor system generates modifications to the navigation of the vehicle. In this manner, under circumstances where a human occupant of an autonomous vehicle recognizes specific events or attributes of the environment with which the autonomous vehicle maybe unfamiliar, the autonomous vehicle is nonetheless capable of making driving decisions based on those events and/or attributes.

20 Claims, 14 Drawing Sheets

(51) Int. Cl.
    *G05D 1/00*           (2006.01)
    *G06K 9/00*           (2006.01)

(56) References Cited

U.S. PATENT DOCUMENTS

| | | |
|---|---|---|
| 9,914,460 B2 * | 3/2018 | Hunt .................... B60W 30/08 |
| 10,083,547 B1 * | 9/2018 | Tomatsu ............ G02B 27/0101 |
| 10,322,728 B1 * | 6/2019 | Porikli ............... G06K 9/00845 |
| 2016/0378112 A1 | 12/2016 | Ljubuncic et al. |
| 2017/0297568 A1 * | 10/2017 | Kentley ................ G06F 3/1454 |
| 2018/0061237 A1 * | 3/2018 | Erickson ................ G08G 1/163 |
| 2018/0065642 A1 | 3/2018 | Frye et al. |
| 2018/0072327 A1 * | 3/2018 | Seppelt .................. G06Q 40/08 |
| 2018/0079427 A1 * | 3/2018 | Herz .................... B60W 50/10 |
| 2018/0088571 A1 * | 3/2018 | Weinstein-Raun .......................... G05D 1/0027 |
| 2018/0088574 A1 * | 3/2018 | Latotzki ............... G05D 1/0246 |
| 2018/0122234 A1 * | 5/2018 | Nascimento ..... G08G 1/096725 |
| 2018/0126901 A1 * | 5/2018 | Levkova ................ B60Q 9/00 |
| 2018/0141562 A1 * | 5/2018 | Singhal .................... A61B 5/01 |
| 2018/0164825 A1 * | 6/2018 | Matus ............... B60W 50/0098 |
| 2018/0284774 A1 * | 10/2018 | Kawamoto ........... B60W 30/09 |
| 2018/0292222 A1 * | 10/2018 | Lin ...................... B60W 40/04 |
| 2018/0365772 A1 * | 12/2018 | Thompson ............. G06Q 40/08 |
| 2019/0241190 A1 * | 8/2019 | Fung .................... B60W 40/08 |
| 2019/0340522 A1 * | 11/2019 | Mori ...................... G06N 20/00 |

\* cited by examiner

CONTROLLING AN AUTONOMOUS VEHICLE BASED ON PASSENGER BEHAVIOR

BACKGROUND

Field of the Various Embodiments

The various embodiments relate generally to autonomous systems, and more specifically to controlling an autonomous vehicle based on passenger behavior.

Description of the Related Art

Modern autonomous vehicles include high-quality sensor systems that gather data reflecting the real-time environment within which those vehicles navigate. This sensor data could include, for example and without limitation, three-dimensional (3D) imagery, 3D point cloud data, range and/or depth data, and so forth. In order to process this data, modern autonomous vehicles include computationally powerful processing systems, which enable relevant features of the environment to be identified based on the data. These processing systems could include, for example and without limitation, complex computer vision models, machine learning models, neural networks, and so forth.

Generally, such systems are trained to make driving decisions using large datasets of sensor data. However, despite having the ability to capture and process a wealth of data in the manner discussed above, a modern autonomous vehicle may occasionally encounter a situation for which the vehicle has not yet been trained. For example, and without limitation, an autonomous vehicle may encounter a complex driving scenario with which the vehicle may be unfamiliar. As a result, the autonomous vehicle may not properly identify one or more relevant conditions associated with the driving scenario including, for example and without limitation, a road marking, an obstacle, a potential collision with a nearby object, and so forth.

As the foregoing illustrates, more effective techniques for controlling autonomous vehicles would be useful.

SUMMARY

One or more embodiments set forth a computer-implemented method for operating an autonomous vehicle, the method comprising determining a first physiological response of a first occupant of an autonomous vehicle based on first sensor data, determining that the first physiological response is related to a first event outside of the autonomous vehicle, and modifying at least one operating characteristic of the autonomous vehicle based on second sensor data that corresponds to the first event.

One advantage of the approach described above is that the sensor system of an autonomous vehicle is augmented with one or more physical senses of occupants of the vehicle. Accordingly, autonomous vehicles configured with the occupant sensor system can make driving decisions based on more information than a conventional autonomous vehicle. Because having more information generally leads to more informed driving decisions, the disclosed techniques represent a significant technological advantage compared to previous approaches.

BRIEF DESCRIPTION OF THE SEVERAL VIEWS OF THE DRAWINGS

So that the manner in which the above recited features can be understood in detail, a more particular description of the various embodiments, briefly summarized above, may be had by reference to certain embodiments, some of which are illustrated in the appended drawings. It is to be noted, however, that the appended drawings illustrate only typical embodiments and are therefore not to be considered limiting of scope, for the contemplated embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

As discussed above, modern autonomous vehicles are capable of capturing and processing a wide variety of sensor data that reflects the external environment in which the vehicle operates. However, a modern autonomous vehicle may, at times, be faced with situations to which the vehicle has not been fully trained to respond. In these situations, a human occupant of the vehicle may recognize and respond to various attributes of the environment with which the autonomous vehicle is unfamiliar.

It would be useful if the autonomous vehicle could analyze the behavior of human occupants in order to gain a better understanding of events and scenarios occurring outside of the vehicle. Then, the autonomous vehicle could make more informed driving decisions, especially in situations where the autonomous vehicle is unfamiliar with one or more aspects of the environment.

Accordingly, various embodiments include an occupant sensor system configured to collect physiological data associated with occupants of a vehicle and then use that data to generate driving decisions. The occupant sensor system includes physiologic sensors and processing systems configured to estimate the cognitive and/or emotional load on the vehicle occupants at any given time. When the cognitive and/or emotional load of a given occupant meets one or more specific criteria, the occupant sensor system generates one or more modifications to the operation and/or navigation of the vehicle. In this manner, under circumstances where a human occupant of an autonomous vehicle recognizes specific events or attributes of the environment with which the autonomous vehicle may be unfamiliar, the autonomous vehicle is nonetheless capable of making driving decisions based on those events and/or attributes.

One advantage of the approach described above is that the sensor system of an autonomous vehicle is augmented with one or more physical senses of occupants of the vehicle. Accordingly, autonomous vehicles configured with the occupant sensor system can make driving decisions based on more information than a conventional autonomous vehicle. Because having more information generally leads to more informed driving decisions, the disclosed techniques represent a significant technological advantage compared to previous approaches.

System Overview

Figure 1:
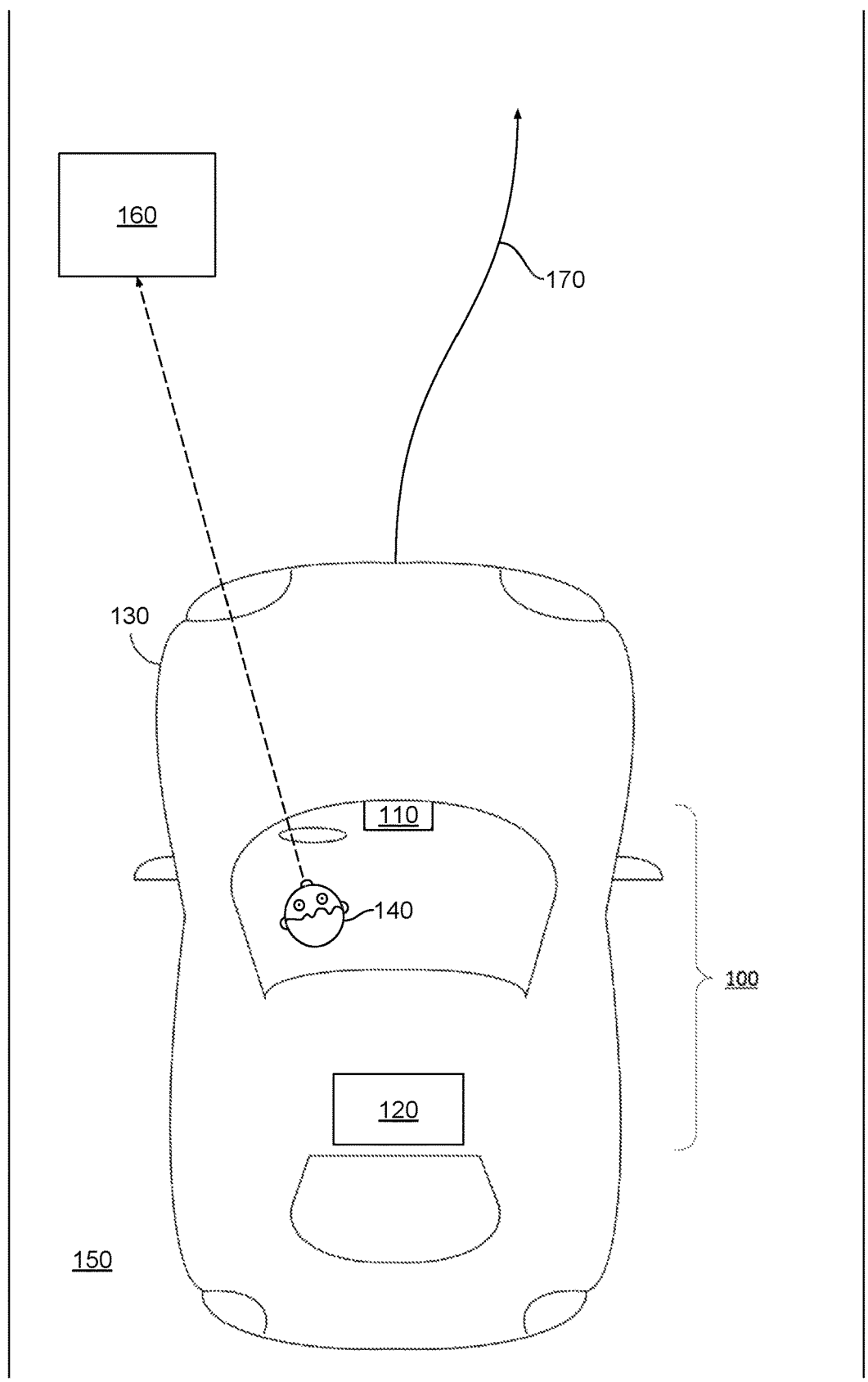
FIG. 1 illustrates a system configured to implement one or more aspects of the various embodiments.

FIG. 1 illustrates a system configured to implement one or more aspects of the various embodiments. As shown, an occupant sensor system 100 includes a sensor array 110 and a computing device 120 that reside within an autonomous vehicle 130. An occupant 140 also resides within autonomous vehicle 130. Autonomous vehicle 130 drives along a roadway 150. Autonomous vehicle 150 could be, for example and without limitation, a car, truck, boat, ferry, bus, construction machine, spaceship, and any other technically feasible device for transporting things or people.

In operation, sensor array 110 collects sensor data associated with occupant 140 and potentially other occupants of autonomous vehicle 130. The sensor data generally includes physiological data corresponding to occupant 140, including body position and articulation data, head position and orientation data, eye gaze direction data, skin characteristic data, neural activity data, and any other technically feasible type of data that can be captured in relation to a human being.

Computing device 120 processes this sensor data in order to characterize the behavior of occupant 140. In doing so, computing device 120 may generate an estimate of the cognitive and/or emotional load on occupant 140 at any given time. Computing device 120 then establishes a baseline behavior model of occupant 140 by analyzing the behavior of occupant 140 over a time span. Computing device 120 is configured to detect when the behavior of occupant 140 diverges from this baseline model. When behavioral divergence is detected, computing device 120 identifies a triggering event which may have caused the detected divergence in occupant behavior. Computing device 120 then determines whether the triggering event occurs inside of autonomous vehicle 130 or outside of autonomous vehicle 130. Triggering events occurring inside of autonomous vehicle 130 may be benign in nature, while triggering events occurring outside of autonomous vehicle 130 may warrant modifications to the driving of autonomous vehicle 130.

Accordingly, if computing device 120 determines that the triggering event occurs inside of vehicle 130, then computing device 120 may determine that no modifications to the operation and/or navigation of autonomous vehicle 130 are needed. Otherwise, if computing device 120 determines that the triggering event occurs outside of vehicle 130, then computing device 120 may initiate specific actions. Those actions may include gathering additional sensor data and/or performing specific steering and/or braking maneuvers, among others. An exemplary maneuver performed in response to a behavior of occupant 140 is depicted in FIG. 1.

As is shown, occupant 140 turns to look directly at an object 160 that resides on roadway 150. Object 160, in this example, is a box, although object 160 may also include objects that are typically undetectable by conventional sensor systems. Occupant sensor system 100 identifies that the head orientation of occupant 140 has diverged from a baseline head orientation. In response, occupant sensor system 100 analyzes sensor data captured via one or more outward facing sensors (potentially included in sensor array 110) and then identifies the presence of object 160. Occupant sensor system 100 then generates a modification to the steering of autonomous vehicle 130, thereby causing autonomous vehicles 130 to travel along trajectory 170 and avoid object 160.

The techniques described above provide autonomous vehicle 130 with additional input that can be used to make more informed driving decisions. In other words, autonomous vehicle 130 is capable of harvesting sensory data that is captured by occupant 140 and then expressed as behavioral changes. One advantage of this approach is that autonomous vehicle 130 may be capable of negotiating complex driving scenarios with which occupant 140 is familiar, without autonomous vehicle 130 being specifically trained to negotiate those particular scenarios.

Hardware Overview

Figure 2:
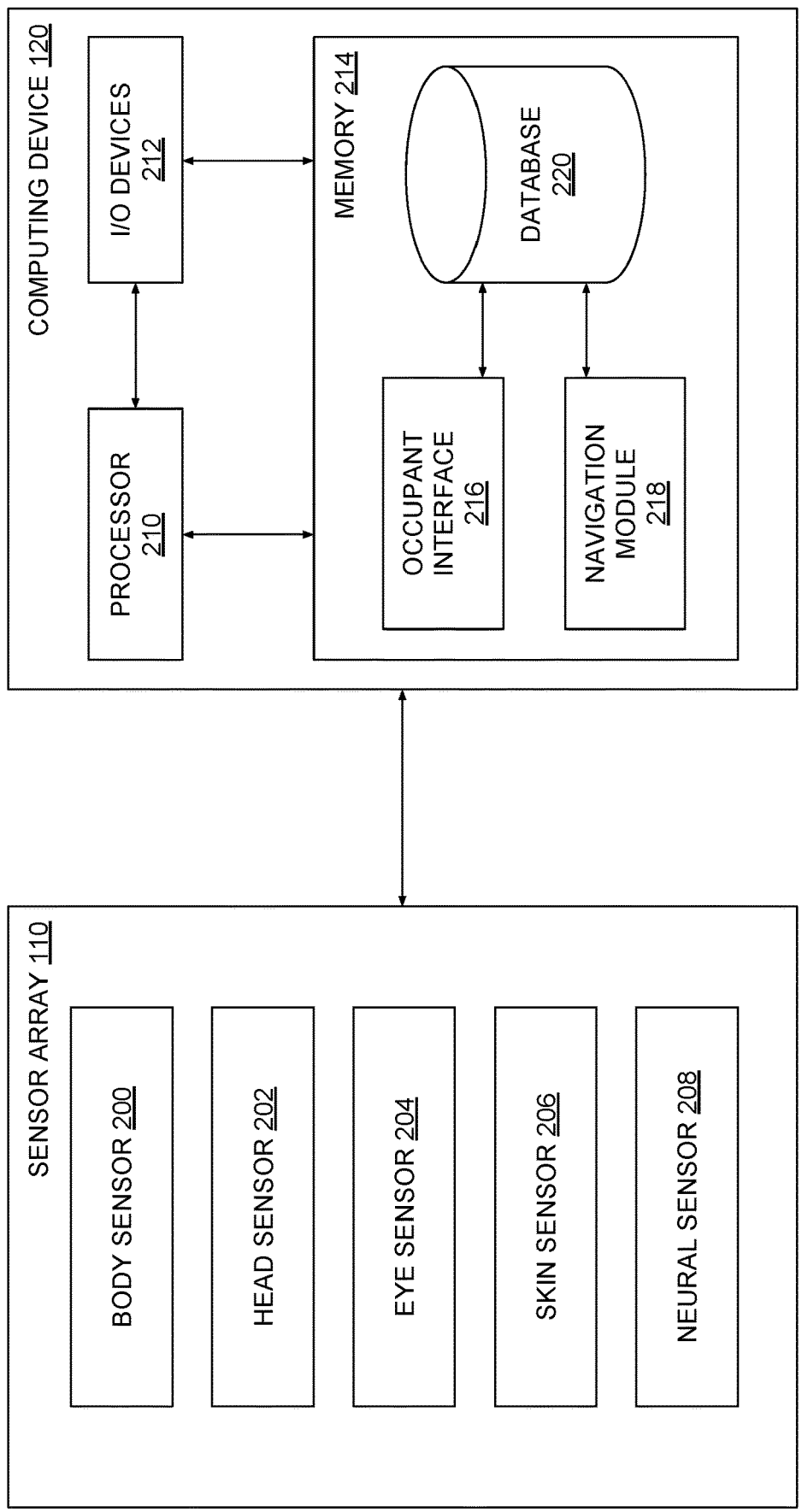
FIG. 2 is a more detailed illustration of the occupant sensor system of FIG. 1, according to various embodiments.

FIG. 2 is a more detailed illustration of the occupant sensor system of FIG. 1, according to various embodiments. As shown, sensor array 110 is coupled to computing device 120 within occupant sensor system 100. Sensor array 110 includes a body sensor 200, a head sensor 202, an eye sensor 204, a skin sensor 206, and a neural sensor 208.

Body sensor 200 may include optical sensors configured to determine the gesticulation and/or posture of occupant 140, musculature sensors configured to determine muscle contractions of occupant 140, breathing sensors configured to measure breathing rates of occupant 140, heart rate sensors configured to generate electrocardiogram readings of occupant 140, weight sensors configured to quantify the weight distribution of occupant 140, and any other technically feasible type of physiological sensor configured to measure any quantifiable aspects of the body of a human being. Head sensor 202 may include optical sensors, magnetic sensors, blood flow sensors, muscle contraction sensors, thermal sensors, radar sensors, and any other technically feasible type of physiological sensor via which the position and/or orientation of the head of a human being can be determined. Eye sensor 204 may include an eye gaze direction module, a vergence sensor, a pupillometry sensor, an optical depth sensor, and any other technically feasible type of physiological sensor via which the gaze direction and/or eye convergence distance of a human being can be determined. Skin sensor 206 may include a galvanic response monitor, a skin conduction sensor, a skin texture sensor, and any other technically feasible type of physiological sensor via which one or more attributes of the skin of a human being can be quantified. Neural sensor 208 may include a neural activity measurement device, a functional magnetic resonance imaging (FMRI) unit, an optogenetics module, and any other technically feasible type of physiological sensor via which any form of human neural activity can be quantified. Although specific types of sensors are shown within sensor array 110, persons skilled in the art will understand that any other technically feasible type of sensor may also be included in sensor array 110. Sensor array 110 captures real-time sensor data associated with occupants of autonomous vehicle 130, including occupant 140, and then transmits this data to computing device 120 for processing.

Computing device 120 includes a processor 210, input/output (I/O) devices 212, and memory 214, coupled together. Processor 210 includes any technically feasible set of hardware units configured to process data and execute software applications. For example, and without limitation, processor 210 could include one or more of a central processing unit (CPU), a graphics processing unit (GPU), and an application specific integrated circuit (ASICs). I/O devices 212 include any technically feasible set of devices configured to perform input and/or output operations, including, for example, and without limitation, a display device, a keyboard, a mouse, and a touchscreen, among others. Memory 214 includes any technically feasible set of storage media configured to store data and software applications, such as a hard disk, a random-access memory (RAM) module, and a read-only memory (ROM), for example. Memory 214 includes an occupant interface 216, a navigation module 218, and a database 220.

Occupant interface 216 is a software application including program code that, when executed by processor 210, analyzes sensor data captured via sensor array 110 and then generates modifications to the driving of autonomous vehicles 130 based on behavioral changes of occupant 140. As a general matter, occupant interface 216 coordinates any and all of the various functionalities of occupant sensor system 100 described herein. Navigation module 218 is a software application including program code that, when executed by processor 210, analyzes sensor data captured via outward facing sensors (potentially included in sensor array 110) and then navigates autonomous vehicle 130 based on that sensor data. Navigation module 218 may include a wide variety of different types of decision-making algorithms, including, for example and without limitation, machine learning models, computer vision models, artificial neural networks, and so forth. Navigation module 218 is configured to interoperate with occupant interface 216 in order to adjust the navigation of autonomous vehicle 130 based on behavioral changes detected in occupant 140 and other occupants of autonomous vehicle 130. In one embodiment, occupant interface 216 updates a driving model associated with navigation module 218 based on captured sensor data and driving adjustments generated by occupant interface 216, thereby improving the operation of navigation module 218 based on the behavior of occupant 140. Occupant interface 216 is described in greater detail below in conjunction with FIGS. 3-6.

Software Overview

Figure 3:
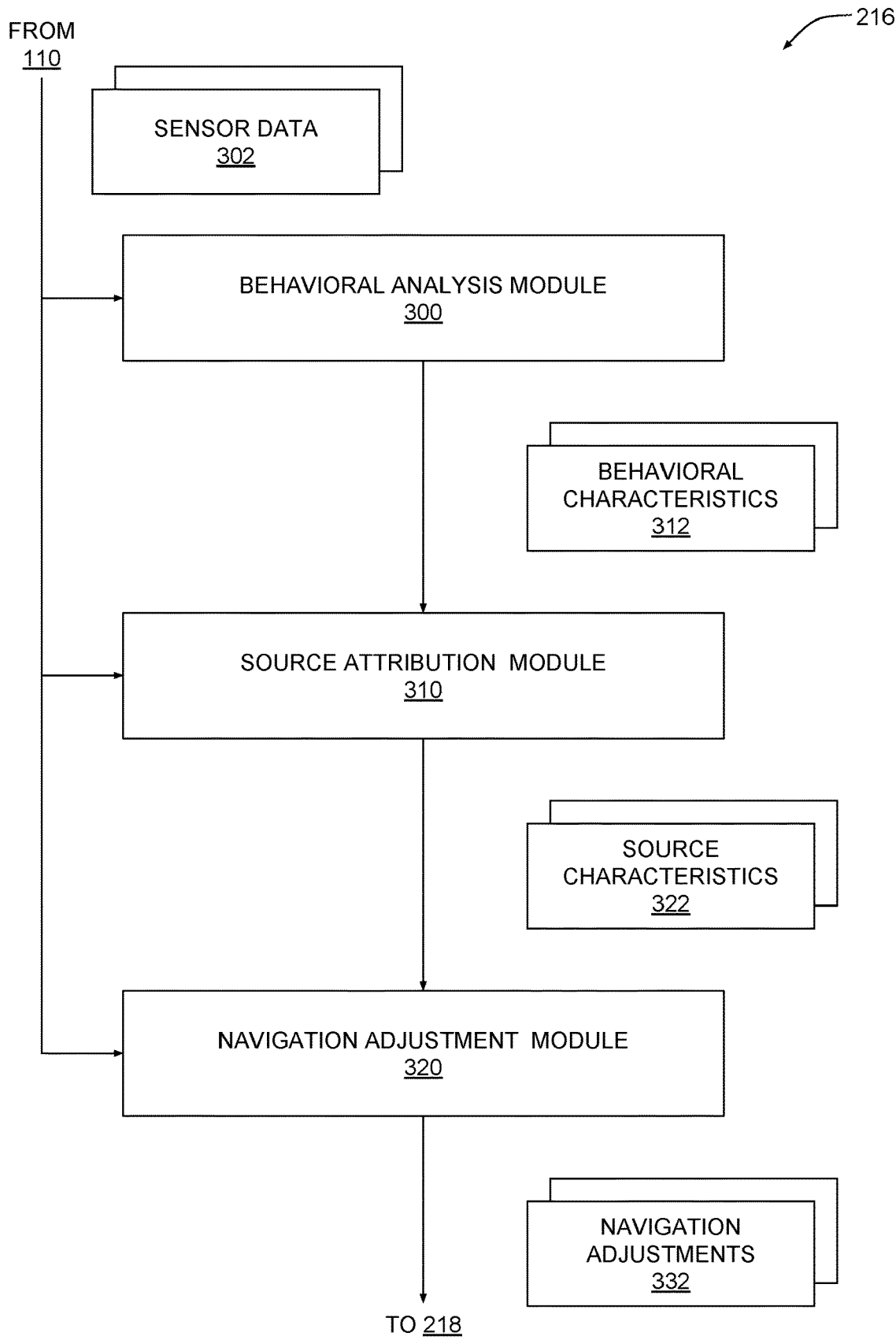
FIG. 3 is a more detailed illustration of the occupant interface of FIG. 2, according to various embodiments.

FIG. 3 is a more detailed illustration of the occupant interface of FIG. 2, according to various embodiments. As shown, occupant interface 216 includes a behavioral analysis module 300, a source attribution module 310, and a navigation adjustment module 320. The various module shown are configured to process and analyze sensor data 302 captured via sensor array 110.

Behavioral analysis module 300 analyzes sensor data 302 in order to establish a baseline physiological model of occupant 140. This physiological model may define a baseline cognitive and/or an emotional load on occupant 140 at any given time. When the behavior of occupant 140 diverges from this baseline model, behavioral analysis module 300 outputs behavioral characteristics 312 to source attribution module 310. Behavioral characteristics 312 include data indicating the scope and magnitude of detected behavioral changes. For example, and without limitation, behavioral characteristics 312 could indicate that occupant 140 very quickly changed an eye convergence distance from a location inside of autonomous vehicle 130 to a location outside of autonomous vehicle 130.

Source attribution module 310 processes behavioral characteristics 312 and then determines a source event that may have caused the behavioral divergence detected in occupant 140. Source attribution module 310 also determines whether the source event is active inside of autonomous vehicle 130 or active outside of autonomous vehicle 130. Returning to the example mentioned above, source attribution module 310 could process depth of focus information included in behavioral characteristics 312 and then determine that occupant 140 has shifted focus towards an event occurring outside of autonomous vehicle 130. A given event could be, for example and without limitation, the presence of an object or person outside of the vehicle, a developing driving situation, a vehicle accident, as well as a sudden noise inside of vehicle, a received phone call, and so forth. Events occurring outside of autonomous vehicle 130 may be relevant to the safety of autonomous vehicles 130 and occupants residing therein, and so adjustments to the driving of the autonomous vehicle 130 may be warranted when such events are identified. In one embodiment, source attribution module 310 may initiate the collection of additional sensor data and/or the enhanced analysis of collected sensor data when determining source events. Source attribution module 310 generates source characteristics 322 to describe these external events and transmits this data to navigation adjustment module 320.

Navigation adjustment module 320 analyzes source characteristics 322 and then determines one or more driving actions that can be performed in order to accommodate the external event. The one or more driving actions may include steering maneuvers, braking maneuvers, acceleration maneuvers, and any other technically feasible action that can be performed by autonomous vehicle 130. Navigation adjustment module 320 outputs navigation adjustments 332 to navigation module 218 in order to adjust the navigation of autonomous vehicle 130 in response to the identified event.

Behavioral analysis module 300, source attribution module 310, and the navigation adjustment module 320 are described in greater detail below in conjunction with FIGS. 4-6, respectively.

Figure 4:
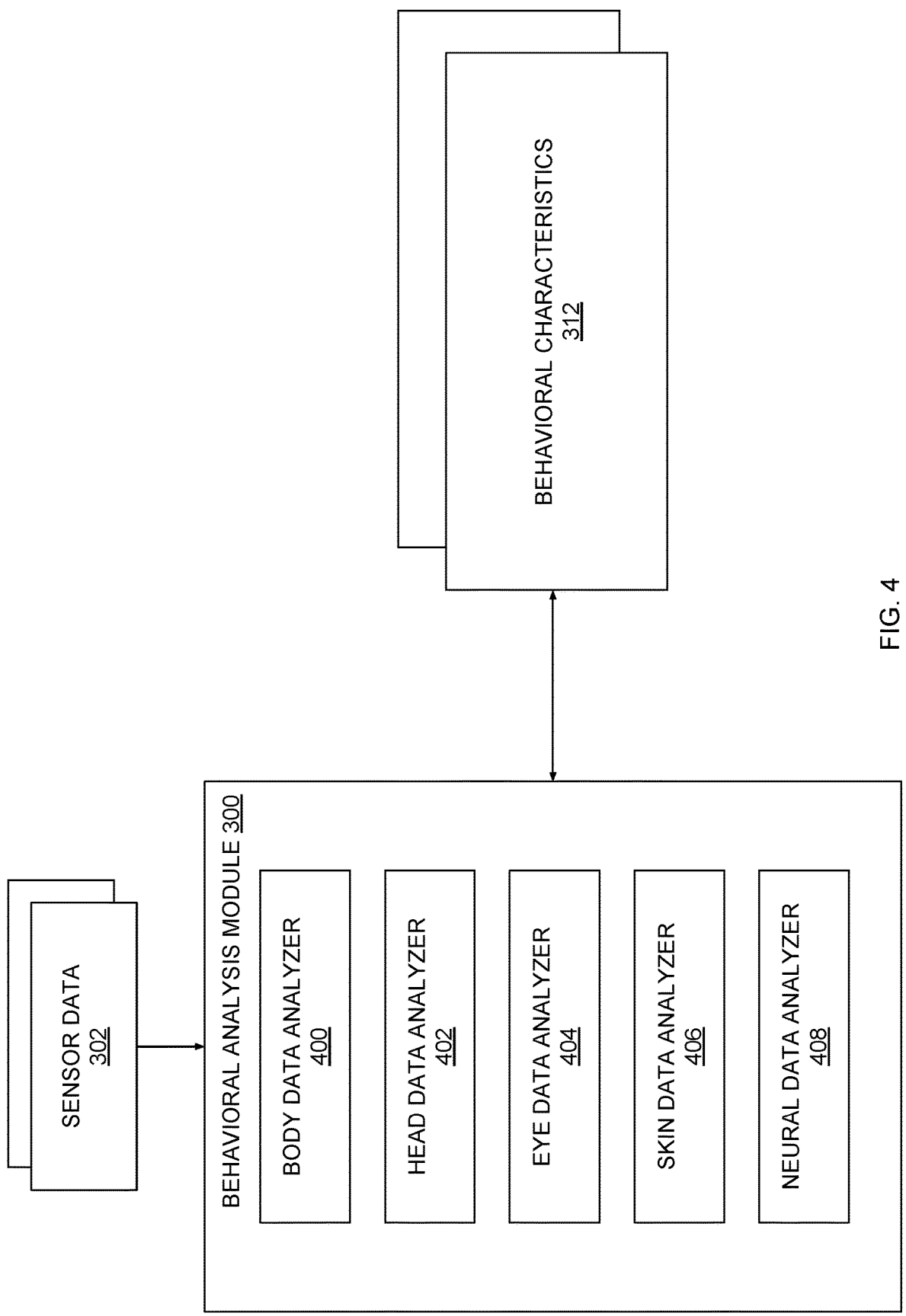
FIG. 4 is a more detailed illustration of the behavioral analysis module of FIG. 3, according to various embodiments.

FIG. 4 is a more detailed illustration of the behavioral analysis module of FIG. 3, according to various embodiments. As shown, behavioral analysis module 300 includes body data analyzer 400, head data analyzer 402, eye data analyzer 404, skin data analyzer 406, and neural data analyzer 408. The different analyzers shown generally correspond to the various sensors included in sensor array 110. In particular, body data analyzer 400 processes data captured via body sensor 200, head data analyzer 402 processes data captured via head sensor 202, eye data analyzer 404 processes data captured via eye sensor 204, skin data analyzer 406 processes data captured via skin sensor 206, and neural data analyzer 408 processes data captured via neural sensor 208.

These different analyzers interoperate in order to generate the baseline behavior model of occupant 140 mentioned above. In doing so, the analyzers shown may estimate the cognitive and/or emotional load of occupant 140 based on various physiological cues identified within the different types of physiological data captured. For example, and without limitation, neural data analyzer 408 could analyze brainwave patterns captured via neural sensor 208 and identify that occupant 140 is experiencing a spike in cognitive load. In another example, and without limitation, skin data analyzer 406 could analyze galvanic skin response data captured via skin sensor 206 and determine that occupant 140 has suddenly begun to perspire, thereby indicating an elevated emotional stress level. Although specific analyzers are shown within behavioral analyzer 300, persons skilled in the art will understand that any technically feasible type of data and analysis module may further be included therein in order to analyze any data captured via sensor array 110.

Based on the types of analyses discussed above, behavioral analysis module 300 generates behavioral characteristics 312 to be transmitted to source attribution module 310, as described in greater detail below in conjunction with FIG. 5.

Figure 5:
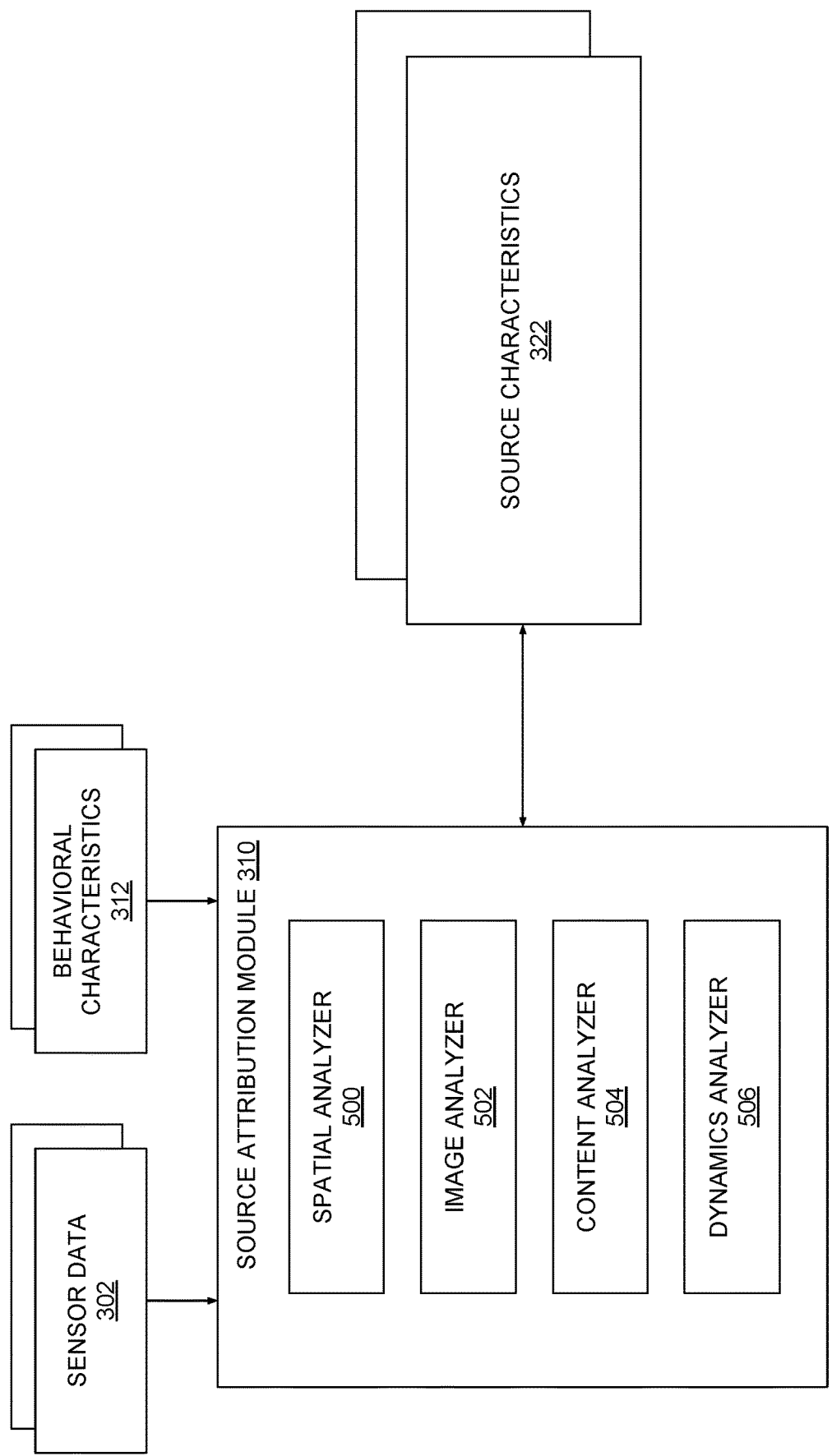
FIG. 5 is a more detailed illustration of the source attribution module of FIG. 3, according to various embodiments.

FIG. 5 is a more detailed illustration of the source attribution module of FIG. 3, according to various embodiments. As shown, source attribution module 310 includes a spatial analyzer 500, an image analyzer 502, a content analyzer 504, and a dynamics analyzer 506.

Spatial analyzer 500 is configured to analyze 3D spatial data in order to identify various features, objects, and events. The 3D spatial data may include stereoscopic imagery, point cloud data, depth information, and so forth. Spatial analyzer 500 could, for example and without limitation, process a stereoscopic video feed in order to determine that a stationary object resides at a specific distance and direction relative to autonomous vehicle 130. Spatial analyzer 500 may also process behavioral characteristics 312 and attribute changes in the behavior of occupant 140 to any identified feature, object, and/or event residing or occurring outside of autonomous vehicle 130. Continuing the above example, without limitation, spatial analyzer 500 could process behavioral characteristics 312 and determine that occupant 140 has suddenly focused attention onto the identified stationary object, and then attribute this change in behavior to the presence of that object.

Image analyzer 502 is configured to analyze optical imagery in order to identify various features of objects and events, in like fashion to spatial analyzer 500. Image analyzer 502 may implement computer vision techniques, feature detection, and other approaches to classifying specific portions of images as corresponding to particular classes of objects. For example, and without limitation, image analyzer 502 could process an optical feed and then classify a portion of an image in that feed as containing a wild animal. Image analyzer 502 also processes behavioral characteristics 312 and attributes changes in the behavior occupant 140 to any classified portions of images. In the above example, without limitation, image analyzer 502 could process behavioral characteristics 312 and determine that occupant 140 has suddenly turned their head in a direction associated with the identified wild animal, and then attribute this change in behavior to the presence of that animal.

Content analyzer 504 is configured to analyze content to which occupant 140 is exposed to in order to identify portions of that content which may be responsible for causing behavioral changes in occupant 140. For example, and without limitation, content analyzer 504 could analyze a film that occupant 140 is watching, and then determine that the film includes an intense action scene currently being displayed to occupant 140. Content analyzer 504 also processes behavioral characteristics 312 and attributes changes in the behavior of occupant 140 portions of that media content. In the above example, without limitation, content analyzer 504 could process behavioral characteristics 312 and determine that the heart rate of occupant 140 has suddenly spiked in conjunction with occupant 140 watching the intense action scene. Then, content analyzer 504 could attribute this change in behavior to excitement occupant 140 may experience while watching the action scene. Another example of how source attribution module 310 attributes a behavioral change to an in-vehicle event is depicted in conjunction with FIGS. 7A-7B.

Dynamics analyzer 506 is configured to analyze the dynamics of autonomous vehicle 130 and then identify dynamic attributes of autonomous vehicle 130 which may cause behavioral changes in occupant 140. For example, and without limitation, dynamics analyzer 506 could determine that because autonomous vehicle 130 is driving along a winding road, autonomous vehicle 130 is changing direction rapidly. Dynamic analyzer 506 could then analyze behavioral characteristics 312 and attributes changes in the behavior of occupant 140 to the dynamics of autonomous vehicle 130. In this example, without limitation, dynamics analyzer 506 could process behavioral characteristics 312 and identify a sudden increase in skin conductivity of occupant 140, and then attribute this physiologic change to occupant 140 becoming carsick. In this example changes to the navigation of autonomous vehicle 130 may not be warranted, because the behavioral changes in occupant 140 are not derived from events occurring outside of autonomous vehicle 130. Nonetheless, autonomous vehicle may still adjust speed and/or navigation in order to prevent occupant 140 from being carsick.

Via the various analyzers described above, source attribution module 310 is configured to attribute changes in the behavior of occupant 140 to various events that may occur inside or outside of autonomous vehicle 130. These different analyzers may interoperate in order to attribute specific portions of behavioral characteristics 312 to particular events, and attribute other portions of behavioral characteristics 312 to other events. As a general matter, source attribution module 310 processes any of the data discussed thus far in order to identify a source of any behavioral changes associated with occupant 140. As mentioned, when the source of these changes is determined to reside outside of autonomous vehicle 130, then occupant sensor system 100 may gather additional sensor data and/or initiate corrective action.

Figure 6:
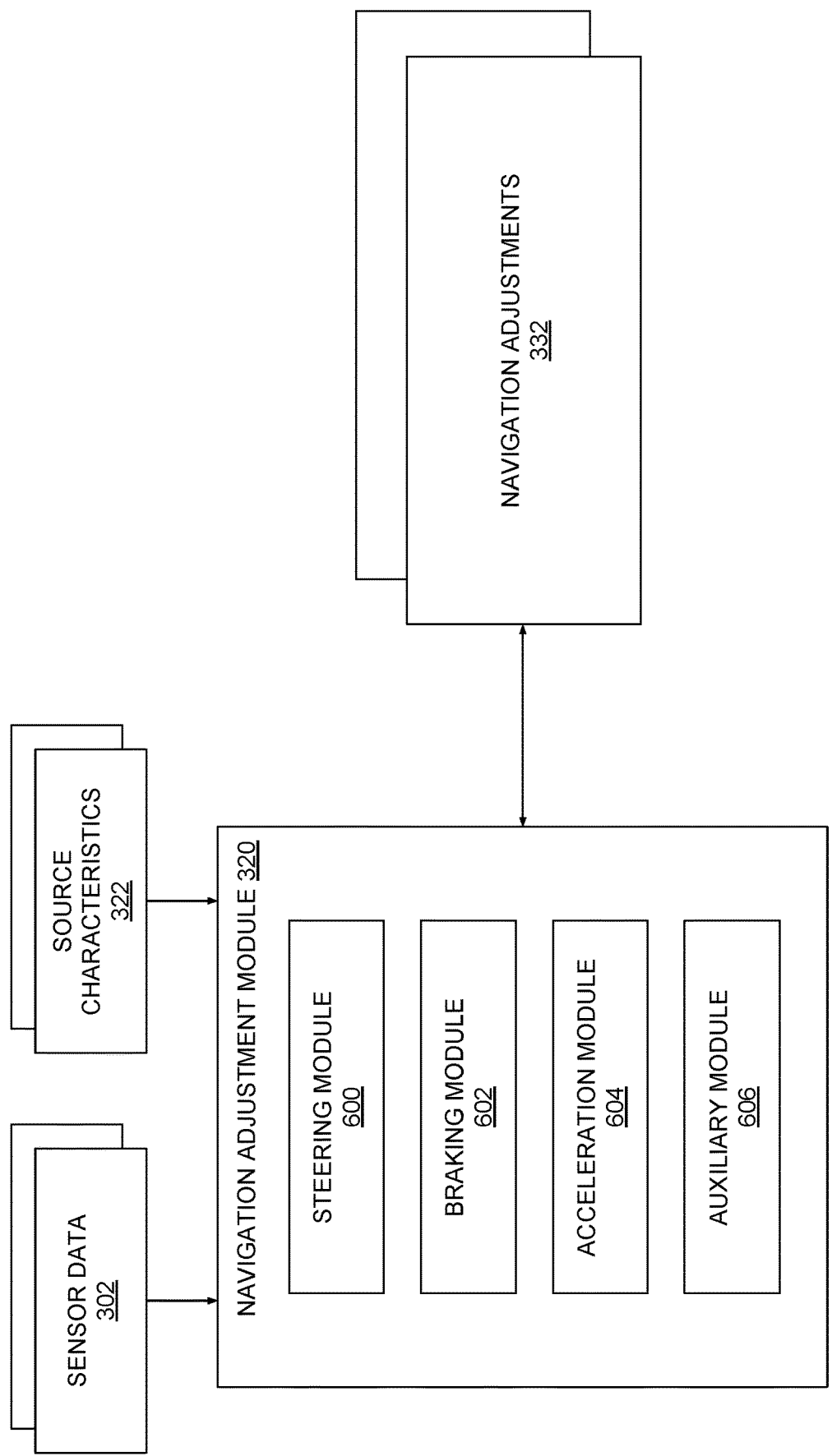
FIG. 6 is a more detailed illustration of the navigation adjustment module of FIG. 3, according to various embodiments.
Figure 8A:
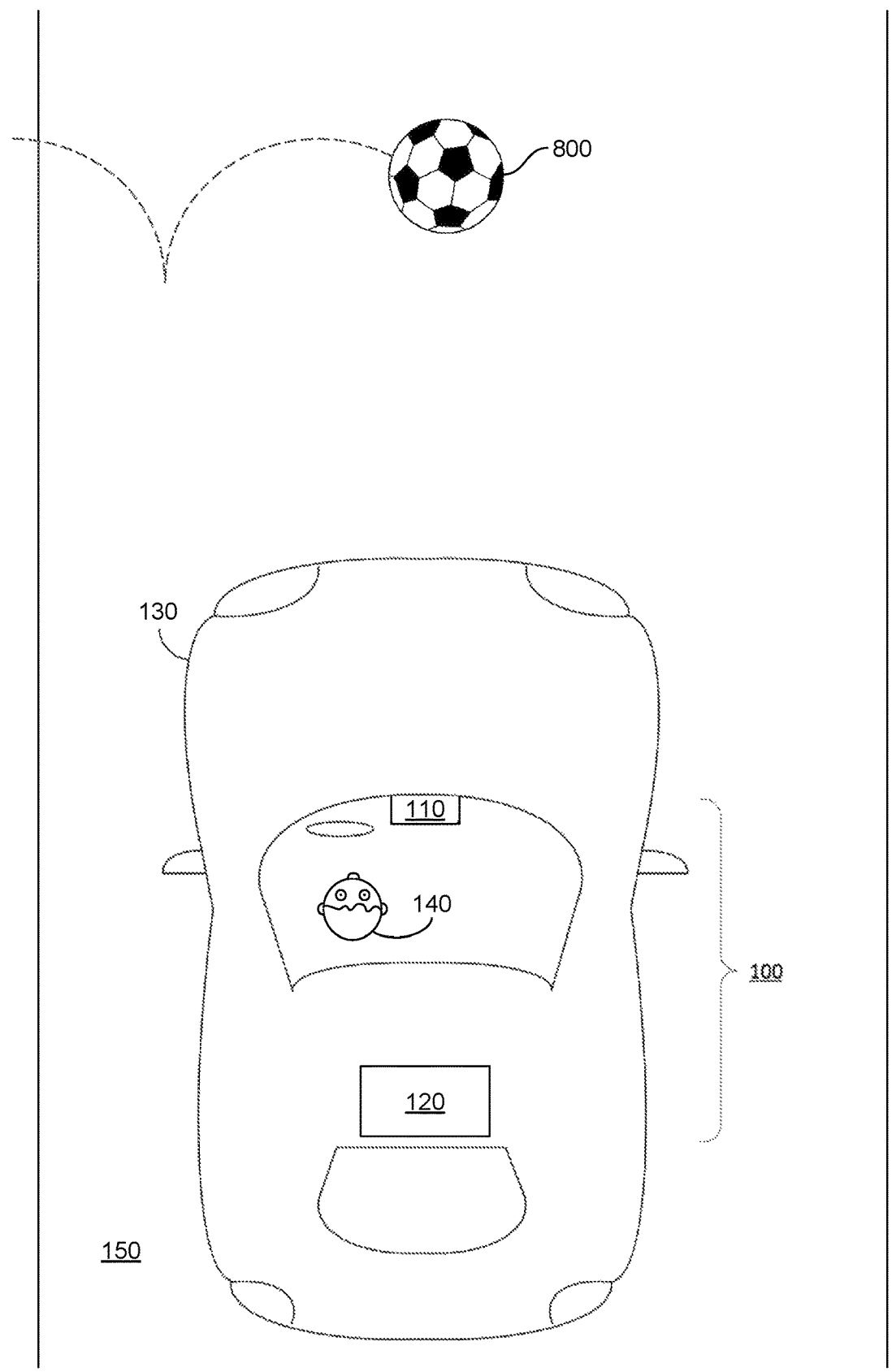
FIGS. 8A-8B illustrate an example of how the occupant sensor system of FIG. 1 attributes an occupant behavior to an event occurring outside of the vehicle, according to various embodiments.
Figure 8B:
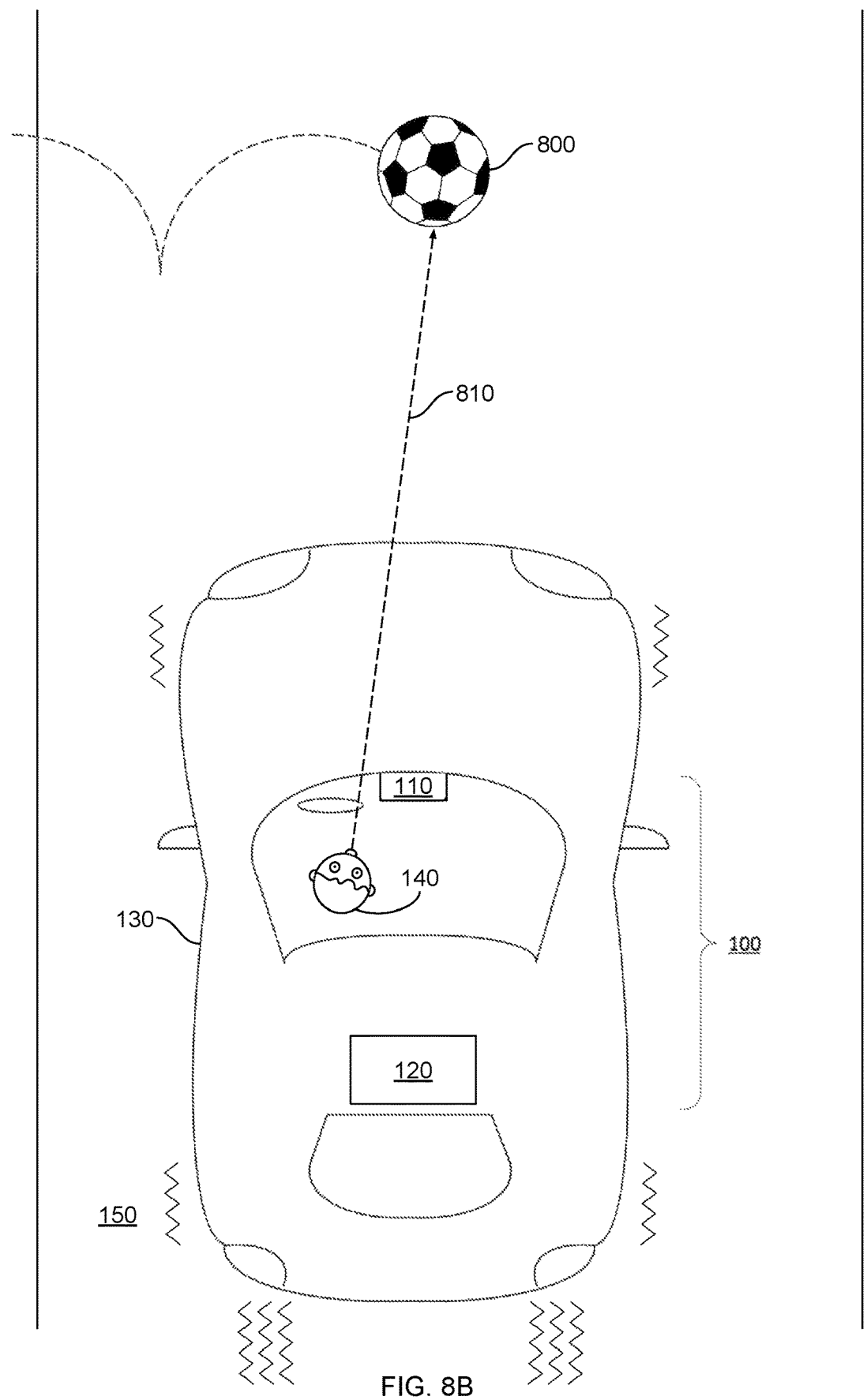

FIG. 6 is a more detailed illustration of the navigation adjustment module of FIG. 3, according to various embodiments. As shown, navigation adjustment module 320 includes steering module 600, braking module 602, acceleration module 604, and auxiliary module 606. The various modules shown initiate specific types of corrective actions in response to events occurring outside of autonomous vehicle 130 that are identified based on behavioral changes in occupant 140. Different types of events may trigger one or more of the modules shown to generate modifications to the navigation of autonomous vehicle 130 and other operating characteristics. For example, and without limitation, the detection of an object on one side of autonomous vehicle 130 could cause steering module 600 to generate a steering modification according to which autonomous vehicle 130 steers away from the object. This particular example is also illustrated in FIG. 1. In another example, and without limitation, the presence of a particular type of object could cause braking module 602 to immediately apply the brakes of autonomous vehicle 130. An example of this scenario is depicted in FIGS. 8A-8B. Acceleration module 604, for example and without limitation, could accelerate autonomous vehicle 130 past a potentially dangerous driving situation.

Auxiliary module 606 may also adjust other operating characteristics of autonomous vehicle 130 based on identified events, including, for example and without limitation, activating headlights, activating the vehicle horn, closing/opening doors and/or windows, closing/opening external air vents, activating an external voice agent for communicating with pedestrians, enabling a pass-through audio system to project external sounds inside the vehicle, enabling external warning lights, displaying information on internal displays, projecting data onto sidewalks and/or roadways, contacting emergency services, sharing any collected or generated data with other nearby vehicles and/or cloud based services, and so forth. As a general matter, the term "operating characteristic" may refer to any functional attribute of autonomous vehicle 130.

Exemplary Responses to Occupant Behavior

Figure 7A:
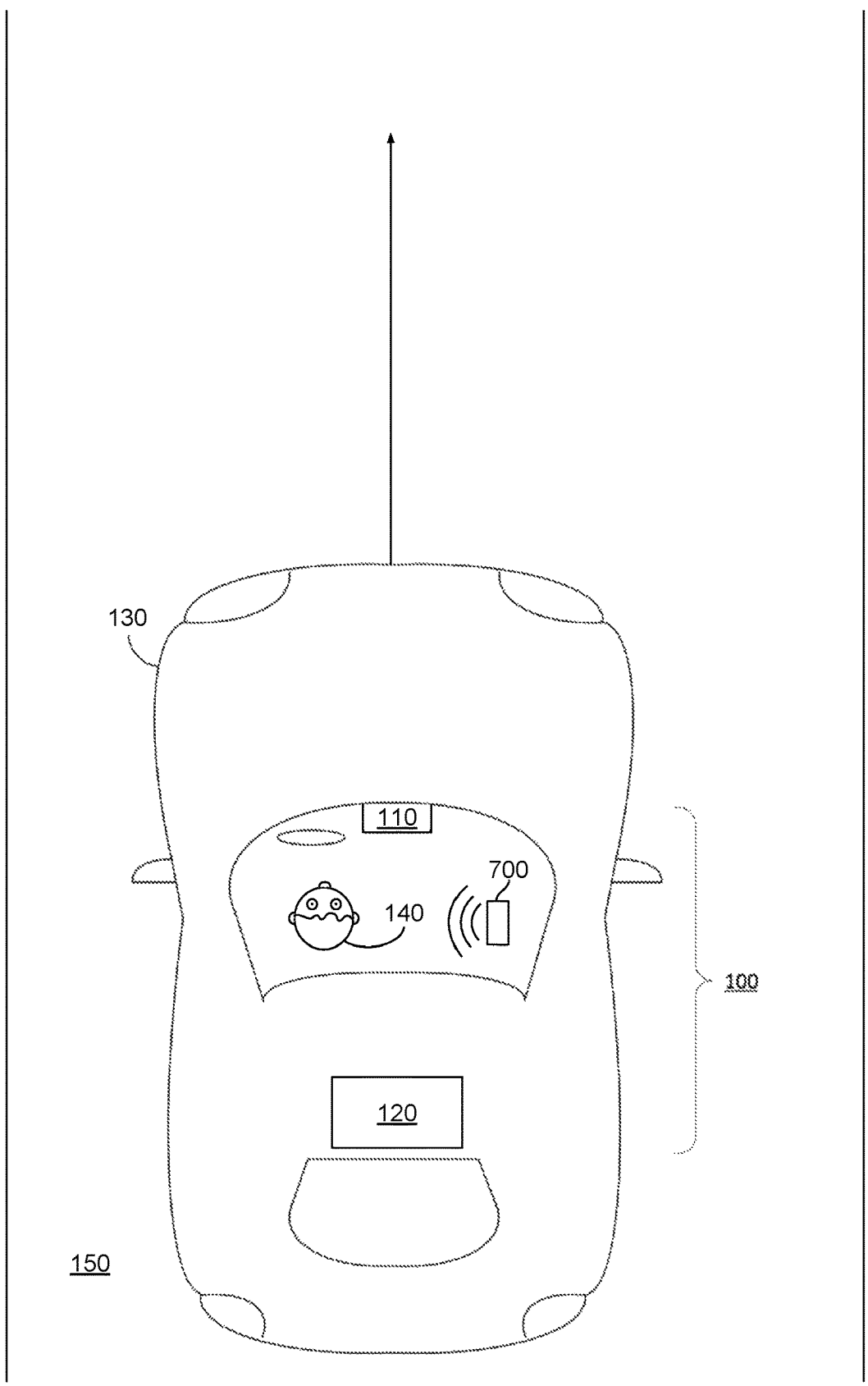
FIGS. 7A-7B illustrate an example of how the occupant sensor system of FIG. 1 attributes an occupant behavior to an event occurring inside of the vehicle, according to various embodiments.
Figure 7B:
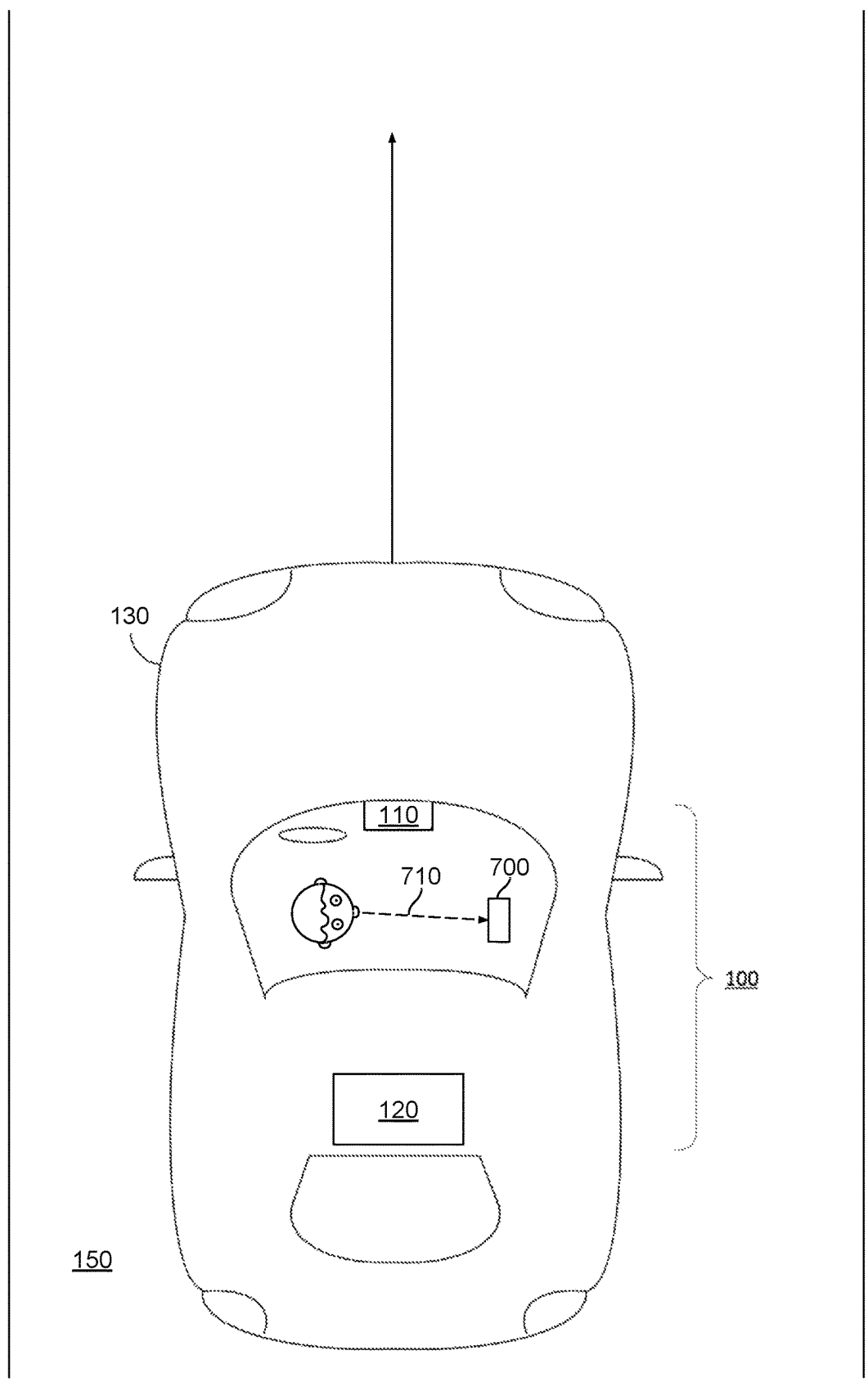

FIGS. 7A-7B illustrates an example of how the occupant sensor system of FIG. 1 attributes an occupant behavior to an event occurring inside of the vehicle, according to various embodiments.

As shown in FIG. 7A, while autonomous vehicle 130 drives along roadway 150, a mobile device 700 residing within autonomous vehicle 130 suddenly begins to ring. Then, as shown in FIG. 7B, occupant 140 turns their head towards mobile device 700 and directs their gaze along path 710.

Occupant sensor system 100 identifies that occupant 140 suddenly turned their head and shifted their gaze, and then analyzes data captured via sensor array 110 to determine that occupant 140 has focused attention (based on eye gaze direction and eye vergence distance) onto mobile device 700, which resides inside of autonomous vehicle 130. Occupant sensor system 100 also determines that mobile device 700 is generating a sound which may be distracting to occupant 140. Occupant sensor system 100 attributes the sudden change in behavior associated with occupant 140 to the ringing of mobile device 700. In this manner, occupant sensor system 100 determines that the source of the identified behavioral changes of occupant 140 resides inside of autonomous vehicle 130, and therefore may not warrant changes to the navigation and/or driving of autonomous vehicle 130. Accordingly, autonomous vehicle 130 remains driving on an original trajectory.

FIGS. 8A-8B illustrates an example of how the occupant sensor system of FIG. 1 attributes an occupant behavior to an event occurring outside of the vehicle, according to various embodiments.

As shown in FIG. 8A, while autonomous vehicle 130 drives along roadway 150, a ball 800 suddenly bounces into roadway 150 across the path of autonomous vehicle 130. Then, as shown in FIG. 8B, occupant 140 suddenly turns their head towards ball 800 and directs their gaze along path 810.

Occupant sensor system 100 identifies that occupant 140 suddenly turned their head and shifted their gaze, and then analyzes data captured via sensor array 110 to determine that occupant 140 has focused attention onto ball 800, which resides outside of autonomous vehicle 130. Occupant sensor system 100 attributes the sudden change in behavior associated with occupant 140 to the presence of ball 800. In this manner, occupant sensor system 100 determines that the source of the identified behavioral changes in occupant 140 resides outside of autonomous vehicle 130, and therefore may warrant changes to the navigation and/or driving of autonomous vehicle 130. Accordingly, autonomous vehicle 130 immediately brakes. In this example, autonomous vehicle 130 need not directly detect the ball, and may rely on the identified behavioral changes in situations where the ball is undetectable.

In one embodiment, occupant sensor system 100 detects the presences of objects outside of vehicle and then predicts the presence of other related objects and/or the occurrence of events related to the detected objects. Then, occupant sensor system 100 adjusts the navigation of autonomous vehicle 130 to account for the presence of any predicted objects. For example, and without limitation, occupant sensor system 100 could detect the presence of ball 800 and then predict that a child may be close by. Then, even when ball 800 does not pose an immediate danger to autonomous vehicle 130 and the occupants therein, occupant sensor system 100 would nonetheless apply the brakes of autonomous vehicle 130 in anticipation of the presence of a child.

In another embodiment, occupant sensor system 100 is configured to interact with a cloud-based repository in order to upload sensor data associated with occupant 140, sensor data associated with events occurring inside or outside of autonomous vehicle 130, and any driving modifications generated in response to those events. Other autonomous vehicles within which an instance of occupant sensor system resides may then access the cloud-based repository in order to generate improved driving decisions. For example, and without limitation, in FIGS. 8A-8B, occupant sensor system 100 could upload sensor data indicating that occupant 140 shifted gaze to focus on ball 800. Occupant sensor system 100 could also upload sensor data representing ball 800 and data indicating the braking maneuver applied in response to the presence of ball 800. Subsequently, other autonomous vehicles could access this data in order to perform similar maneuvers in response to the presence of objects similar to ball 800. The uploaded data may also include geolocation data, thereby allowing any nearby autonomous vehicle to access sensor and driving data relevant to a particular location.

Figure 9A:
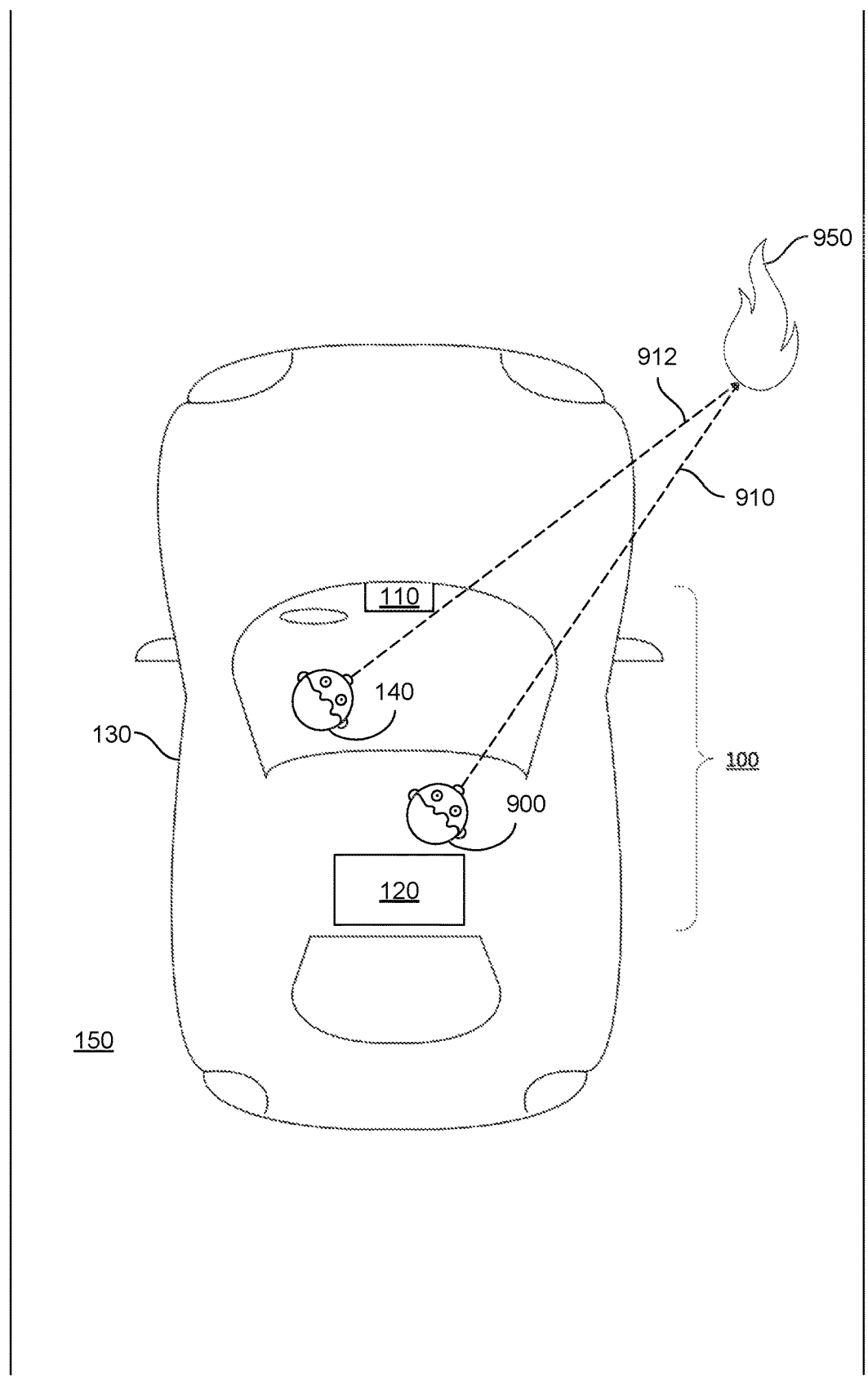
FIGS. 9A-9C illustrate examples of how the occupant sensor system of FIG. 1 attributes various occupant behaviors to an event occurring outside of the vehicle, according to various embodiments.
Figure 9B:
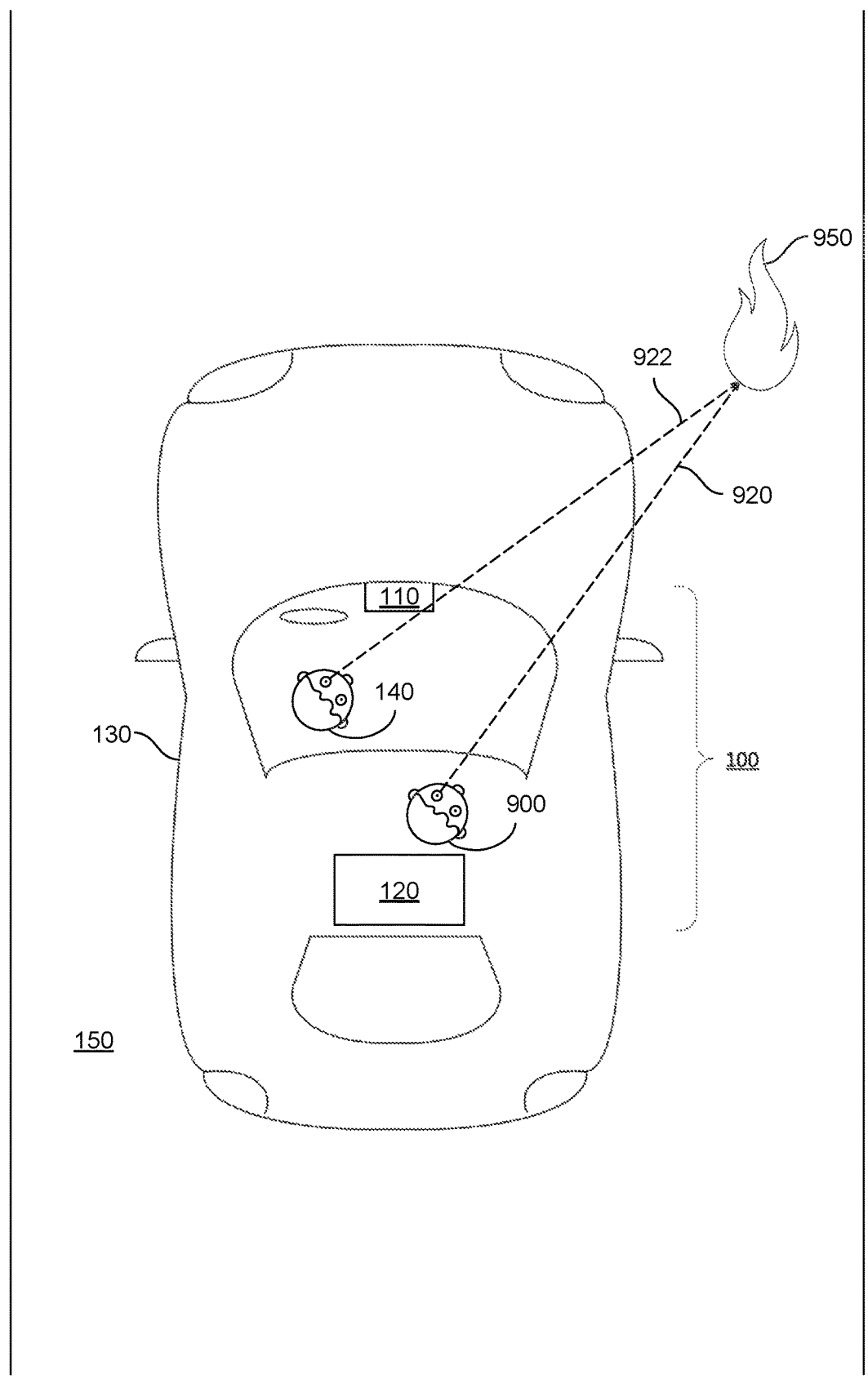
Figure 9C:
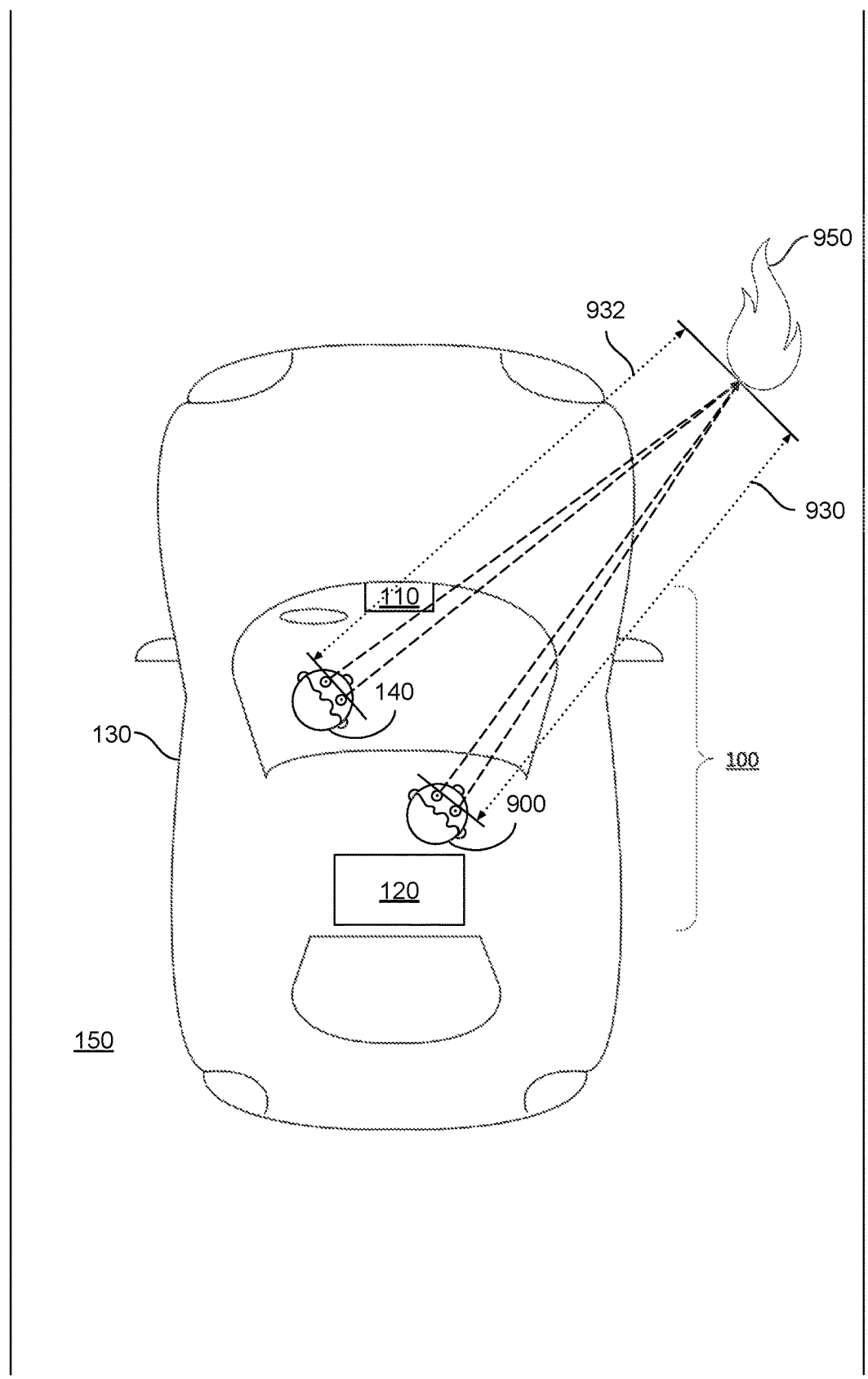

FIGS. 9A-9C illustrate examples of how the occupant sensor system of FIG. 1 attributes various occupant behaviors to an event occurring outside of the vehicle, according to various embodiments.

As shown in each of these Figures, while autonomous vehicle 130 drives along roadway 150, occupant 140 and another occupant 900 both notice a hazard 950 outside of autonomous vehicle 130. In these examples, hazard 950 is a fire, although the techniques described herein are applicable to any noticeable event. Occupant sensor system 100 is configured to implement three different approaches to determining that hazard 950 is of sufficient importance that adjustments to the navigation and/or operation of autonomous vehicle 130 are warranted. With each of these approaches, occupant sensor system 100 determines that both occupants 140 and 900 have shifted focus to hazard 950.

As shown in FIG. 9A, occupant sensor system 100 determines that occupant 900 faces in a direction 910 and occupant 140 faces in a direction 912. Occupant sensor system 100 could, for example and without limitation, implement computer vision techniques to determine a face orientation of each occupant, or gather sensor data from head-mounted wearable devices indicating the head orientation of each occupant. Occupant sensor system 100 then determines that directions 910 and 912 intersect or converge at a specific location outside of autonomous vehicle 130. Occupant sensor system 100 may correlate these directions to hazard 950, although in some cases occupant sensor system 100 may not directly detect hazard 950. Based on occupants 140 and 900 both facing the same location, occupant sensor system 100 may take corrective action, such as steering away from hazard 950 and/or closing air vents of autonomous vehicle 130.

As shown in FIG. 9B, occupant sensor system 100 determines that occupant 900 looks in a direction 920 and occupant 140 looks in a direction 922. Occupant sensor system 100 could, for example and without limitation, analyze eye gaze information associated with each occupant and then determine directions 920 and 922. Occupant sensor system 100 also determines that directions 920 and 922 intersect or converge at a specific location outside of autonomous vehicle 130. As with the above technique, occupant sensor system 100 may or may not correlate these directions to hazard 950. Occupant sensor system 100 determines that corrective action may be necessary and then initiates such action, as needed.

As shown in FIG. 9C, occupant sensor system 100 determines that occupant 900 focuses at a specific vergence distance 930 and occupant 140 focuses at a similar vergence distance 932. Occupant sensor system 100 could, for example and without limitation, analyze eye gaze information associated with each occupant in conjunction with eye vergence distance information for each occupant. Occupant sensor system 100 determines that the eye gaze direction of occupants 140 and 900 intersects, and, further, that the vergence distances 930 and 932 of those occupants is similar. Based on these determinations, occupant sensor system 100 can identify with high confidence that an important event occurs outside of autonomous vehicle 130. Occupant sensor system 100 then determines and executes corrective action.

Referring generally to FIGS. 9A-9C, the various techniques described in conjunction with these Figures can be implemented in combination with one another in order to identify and respond to various events occurring outside of autonomous vehicle 130 and potentially inside the vehicle.

Figure 10:
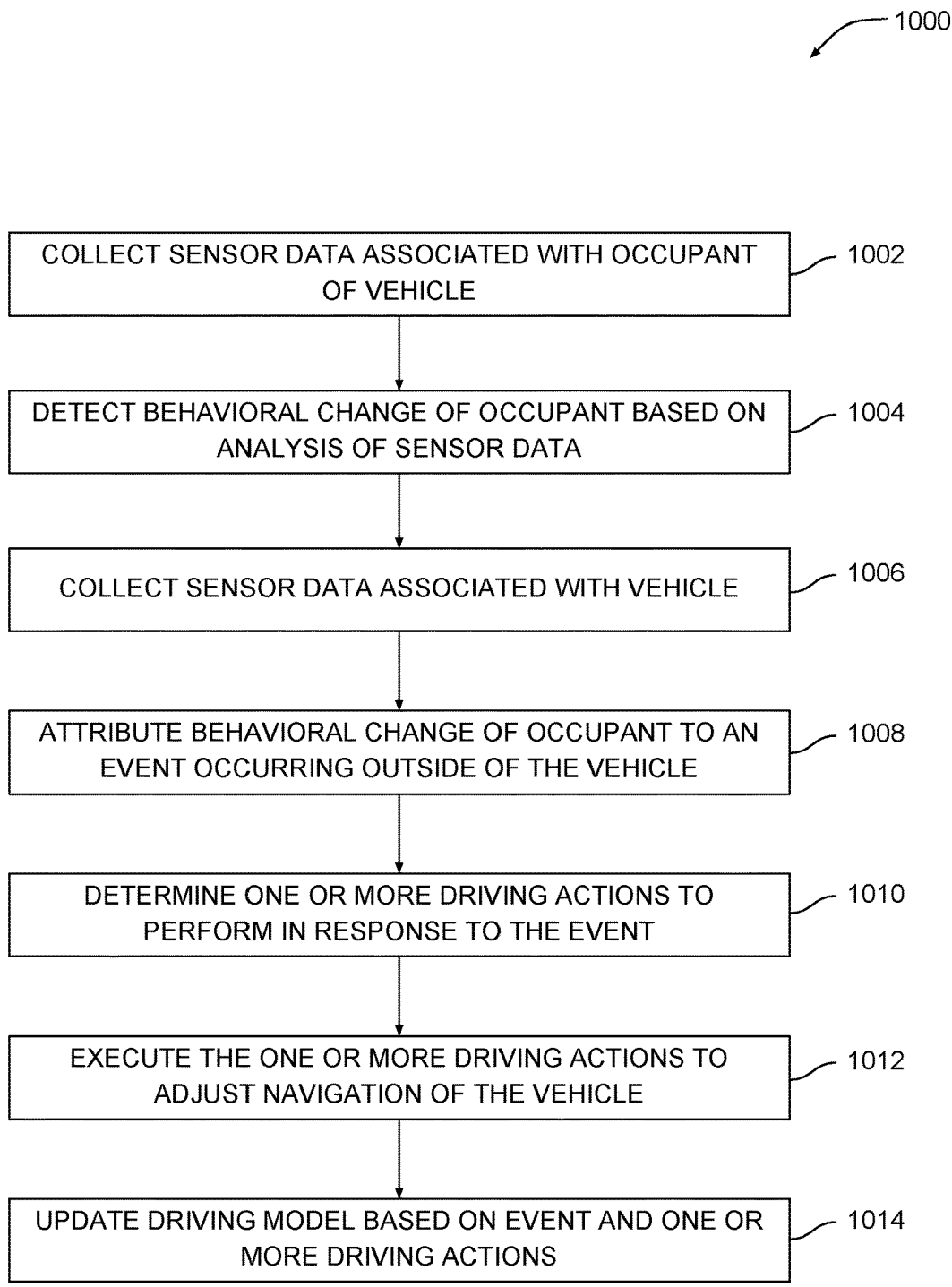
FIG. 10 is a flow diagram of method steps for adjusting the navigation of an autonomous vehicle in response to occupant behaviors, according to various embodiments.

FIG. 10 is a flow diagram of method steps for adjusting the navigation of an autonomous vehicle in response to occupant behaviors, according to various embodiments. Although the method steps are described in conjunction with the systems of FIGS. 1-8B, persons skilled in the art will understand that the method steps can be performed in any order by any system.

As shown, a method 900 begins at step 902, where occupant sensor system 100 collects sensor data associated with an occupant of an autonomous vehicle. The sensor data generally includes physiological data associated with the occupant. At step 904, occupant sensor system 100 detects a behavioral change in the occupant based on analysis of the sensor data. In doing so, occupant sensor system 100 may compare the captured physiological data to a physiological model of occupant 140. At step 906, occupant sensor system 100 collects sensor data associated with the vehicle. The data collected at step 906 may include sensor data captured from outward facing sensors.

At step 908, occupant sensor system 100 attributes the behavioral change of occupant to an event occurring outside of the vehicle. In doing so, occupant sensor system 100 could, for example and without limitation, identify that the occupant has shifted focus from inside the vehicle to outside the vehicle, and then collect additional sensor data and/or perform additional processing with sensor data collected from outside autonomous vehicle 130. At step 910, occupant sensor system 100 determines one or more driving actions or other vehicle actions to perform in response to the event. The determined actions generally allow the autonomous vehicle to accommodate the event and, more specifically, avoid the event. At step 912, occupant sensor system 100 executes the one or more driving actions to adjust navigation of the autonomous vehicle. At step 914, occupant sensor system 100 updates a driving model based on the event and the one or more driving actions.

Persons skilled in the art will understand that any of the foregoing techniques can be applied in the context of non-autonomous vehicles as well as autonomous vehicles. For example, occupant sensor system 100 could provide inputs to a lane-adjust system operating on a non-autonomous vehicle in order to allow that system to avoid occupant-detected objects. Generally, autonomous vehicle 130 may also be implemented via any technically feasible vehicle having any level of autonomy.

In sum, an occupant sensor system is configured to collect physiological data associated with occupants of a vehicle and then use that data to generate driving decisions and other vehicle operations. The occupant sensor system includes physiological sensors and processing systems configured to estimate the cognitive and/or emotional load on the vehicle occupants at any given time. When the cognitive and/or emotional load of a given occupant meets specific criteria, the occupant sensor system generates modifications to the navigation of the vehicle. In this manner, under circumstances where a human occupant of an autonomous vehicle recognizes specific events or attributes of the environment with which the autonomous vehicle maybe unfamiliar, the autonomous vehicle is nonetheless capable of making driving decisions based on those events and/or attributes.

One advantage of the approach described above is that the sensor system of an autonomous vehicle is augmented with the physical senses of one or more occupants of the vehicle. Accordingly, autonomous vehicles configured with the occupant sensor system can make driving decisions based on more information than a conventional autonomous vehicle. Because having more information generally leads to more informed driving decisions, the disclosed techniques represent a significant technological advantage compared to previous approaches.

1. Some embodiments include a computer-implemented method for operating an autonomous vehicle, the method comprising determining a first physiological response of a first occupant of an autonomous vehicle based on first sensor data, determining that the first physiological response is related to a first event outside of the autonomous vehicle, and modifying at least one operating characteristic of the autonomous vehicle based on second sensor data that corresponds to the first event.

2. The computer-implemented method of clause 1, wherein capturing the first sensor data comprises recording at least one of a body position, a body orientation, a head position, a head orientation, a gaze direction, a gaze depth, a skin conductivity reading, and a neural activity measurement.

3. The computer-implemented method of any of clauses 1 and 2, wherein the first physiological response comprises at least one of an increase in cognitive load and an increase in emotional load.

4. The computer-implemented method of any of clauses 1, 2, and 3, wherein determining that the first physiological response is related to the first event comprises determining a first position towards which the first occupant faces or looks, and identifying the first event based on the first position.

5. The computer-implemented method of any of clauses 1, 2, 3, and 4, wherein determining the first position towards which the first occupant faces or looks comprises determining a head orientation or gaze direction associated with the first occupant.

6. The computer-implemented method of any of clauses 1, 2, 3, 4, and 5, further comprising determining that a first position associated with the first event should be physically avoided by the autonomous vehicle.

7. The computer-implemented method of any of clauses 1, 2, 3, 4, 5, and 6, wherein modifying the at least one characteristic of the autonomous vehicle comprises generating a first modification based on the second sensor data, and applying the first modification by causing the autonomous vehicle to perform at least one of a steering maneuver and a braking maneuver in order to avoid the first position.

8. The computer-implemented method of any of clauses 1, 2, 3, 4, 5, 6, and 7, further comprising capturing the second sensor data via one or more outward facing sensors directed towards the first position.

9. The computer-implemented method of any of clauses 1, 2, 3, 4, 5, 6, 7, and 8, further comprising determining a second physiological response of the first occupant of the autonomous vehicle based on third sensor data, determining that the second physiological response is caused by a second event that does not meet the first criteria, and determining that navigation of the autonomous vehicle should not be modified based on the second event.

10. Some embodiments include a non-transitory computer-readable medium storing program instructions that, when executed by a processor, causes the processor to operate an autonomous vehicle by performing the steps of determining a first physiological response of a first occupant of an autonomous vehicle based on first sensor data, determining that the first physiological response is related to a first event, and modifying at least one operating characteristic of the autonomous vehicle based on second sensor data corresponding to the first event.

11. The non-transitory computer-readable medium of clause 10, wherein the first physiological response comprises at least one of an increase in cognitive load and an increase in emotional load.

12. The non-transitory computer-readable medium of any of clauses 10 and 11, wherein modifying the at least one characteristic of the autonomous vehicle comprises generating a first modification based on the second sensor data, and applying the first modification by causing the autonomous vehicle to perform at least one of a steering maneuver and a braking maneuver in order to avoid a first position associated with the first event.

13. The non-transitory computer-readable medium of any of clauses 10, 11, and 12, further comprising the steps of determining a second physiological response of the first occupant of the autonomous vehicle based on third sensor data, determining that the second physiological response is caused by a second event inside the autonomous vehicle, and determining that navigation of the autonomous vehicle should not be modified based on the second event.

14. The non-transitory computer-readable medium of any of clauses 10, 11, 12, and 13, further comprising the steps of transmitting the first sensor data, the second sensor data, and the first modification to a cloud-based repository.

15. The non-transitory computer-readable medium of any of clauses 10, 11, 12, 13, and 14, wherein a second autonomous vehicle is configured to capture third sensor data associated with one or more occupants of the second autonomous vehicle, map the third sensor data to the first sensor data, receive the first modification from the cloud-based repository, and apply the first modification to at least one characteristic of the second autonomous vehicle.

16. The non-transitory computer-readable medium of any of clauses 10, 11, 12, 13, 14, and 15, further comprising the steps of training a machine learning model to recognize the first event based on at least one of the first sensor data and the second sensor data.

17. The non-transitory computer-readable medium of any of clauses 10, 11, 12, 13, 14, 15, and 16, wherein the first event comprises an obstruction on a roadway where the autonomous vehicle operates.

18. The non-transitory computer-readable medium of any of clauses 10, 11, 12, 13, 14, 15, 16, and 17, wherein determining that the first event occurs outside of the autonomous vehicle comprises mapping the first physiological response to a first position located outside of the autonomous vehicle.

19. Some embodiments include a system, comprising a memory storing a software application, and a processor that, upon executing the software application, is configured to perform the steps of: determining a first physiological response of a first occupant of an autonomous vehicle based on first sensor data, determining that the first physiological response is related to a first event outside of the autonomous vehicle, and modifying at least one operating characteristic of the autonomous vehicle based on second sensor data that corresponds to the first event.

20. The system of clause 19, wherein the first physiological response comprises at least one of an increase in cognitive load and an increase in emotional load.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for operating an autonomous vehicle, the method comprising:
   determining a first physiological response of a first occupant of an autonomous vehicle based on first sensor data;
   determining that the first physiological response is related to a first event outside of the autonomous vehicle; and
   modifying at least one operating characteristic of the autonomous vehicle based on second sensor data that corresponds to the first event outside of the autonomous vehicle.

2. The computer-implemented method of claim 1, wherein capturing the first sensor data comprises recording at least one of a body position, a body orientation, a head position, a head orientation, a gaze direction, a gaze depth, a skin conductivity reading, and a neural activity measurement.

3. The computer-implemented method of claim 1, wherein the first physiological response comprises at least one of an increase in cognitive load and an increase in emotional load.

4. The computer-implemented method of claim 1, wherein determining that the first physiological response is related to the first event comprises:
   determining a first position towards which the first occupant faces or looks; and
   identifying the first event based on the first position.

5. The computer-implemented method of claim 4, wherein determining the first position towards which the first occupant faces or looks comprises determining a head orientation or gaze direction associated with the first occupant.

6. The computer-implemented method of claim 1, further comprising determining that a first position associated with the first event should be physically avoided by the autonomous vehicle.

7. The computer-implemented method of claim 6, wherein modifying the at least one characteristic of the autonomous vehicle comprises:
   generating a first modification based on the second sensor data; and
   applying the first modification by causing the autonomous vehicle to perform at least one of a steering maneuver and a braking maneuver in order to avoid the first position.

8. The computer-implemented method of claim 6, further comprising capturing the second sensor data via one or more outward facing sensors directed towards the first position.

9. The computer-implemented method of claim 1, further comprising:
   determining a second physiological response of the first occupant of the autonomous vehicle based on third sensor data;
   determining that the second physiological response is caused by a second event that does not meet a first criteria; and
   determining that navigation of the autonomous vehicle should not be modified based on the second event.

10. A non-transitory computer-readable medium storing program instructions that, when executed by a processor, causes the processor to operate an autonomous vehicle by performing the steps of:
    determining a first physiological response of a first occupant of an autonomous vehicle based on first sensor data;
    determining that the first physiological response is related to a first event; and modifying at least one operating characteristic of the autonomous vehicle based on second sensor data corresponding to the first event outside of the autonomous vehicle.

11. The non-transitory computer-readable medium of claim 10, wherein the first physiological response comprises at least one of an increase in cognitive load and an increase in emotional load.

12. The non-transitory computer-readable medium of claim 10, wherein modifying the at least one characteristic of the autonomous vehicle comprises:
generating a first modification based on the second sensor data; and
applying the first modification by causing the autonomous vehicle to perform at least one of a steering maneuver and a braking maneuver in order to avoid a first position associated with the first event.

13. The non-transitory computer-readable medium of claim 10, further comprising the steps of:
determining a second physiological response of the first occupant of the autonomous vehicle based on third sensor data;
determining that the second physiological response is caused by a second event inside the autonomous vehicle; and
determining that navigation of the autonomous vehicle should not be modified based on the second event.

14. The non-transitory computer-readable medium of claim 10, further comprising the steps of transmitting the first sensor data, the second sensor data, and the modified at least one operating characteristic to a cloud-based repository.

15. The non-transitory computer-readable medium of claim 14, wherein a second autonomous vehicle is configured to:
capture third sensor data associated with one or more occupants of the second autonomous vehicle;
map the third sensor data to the first sensor data;
receive the first modification from the cloud-based repository; and
apply the modified at least one operating characteristic to at least one characteristic of the second autonomous vehicle.

16. The non-transitory computer-readable medium of claim 10, further comprising the steps of training a machine learning model to recognize the first event based on at least one of the first sensor data and the second sensor data.

17. The non-transitory computer-readable medium of claim 10, wherein the first event comprises an obstruction on a roadway where the autonomous vehicle operates.

18. The non-transitory computer-readable medium of claim 10, wherein determining that the first event occurs outside of the autonomous vehicle comprises mapping the first physiological response to a first position located outside of the autonomous vehicle.

19. A system, comprising:
a memory storing a software application; and
a processor that, upon executing the software application, is configured to perform the steps of:
determining a first physiological response of a first occupant of an autonomous vehicle based on first sensor data;
determining that the first physiological response is related to a first event outside of the autonomous vehicle; and
modifying at least one operating characteristic of the autonomous vehicle based on second sensor data that corresponds to the first event outside of the autonomous vehicle.

20. The system of claim 19, wherein the first physiological response comprises at least one of an increase in cognitive load and an increase in emotional load.

* * * * *